United States Patent
Hage et al.

(10) Patent No.: US 11,006,584 B2
(45) Date of Patent: May 18, 2021

(54) SNOW MELTING SYSTEM AND METHOD FOR GREENHOUSE

(71) Applicant: LUFA FARMS, INC., Montreal (CA)

(72) Inventors: Mohamed Hage, Montreal (CA); Lauren Rathmell, Montreal (CA)

(73) Assignee: LUFA FARMS, INC., Montreal (CA)

( * ) Notice: Subject to any disclaimer, the term of this patent is extended or adjusted under 35 U.S.C. 154(b) by 1141 days.

(21) Appl. No.: 15/111,359

(22) PCT Filed: Jan. 19, 2015

(86) PCT No.: PCT/CA2015/050034
§ 371 (c)(1),
(2) Date: Jul. 13, 2016

(87) PCT Pub. No.: WO2015/106359
PCT Pub. Date: Jul. 23, 2015

(65) Prior Publication Data
US 2016/0338272 A1    Nov. 24, 2016

Related U.S. Application Data

(60) Provisional application No. 61/928,495, filed on Jan. 17, 2014.

(51) Int. Cl.
*A01G 9/24*   (2006.01)
*F24H 9/20*   (2006.01)
(Continued)

(52) U.S. Cl.
CPC ............. *A01G 9/24* (2013.01); *A01G 9/14* (2013.01); *A01G 9/20* (2013.01); *A01G 9/245* (2013.01);
(Continued)

(58) Field of Classification Search
CPC . A01G 9/24; A01G 9/245; A01G 9/20; A01G 9/14; A01G 9/246; E04D 13/103; F24H 9/20; Y02A 40/264; E04H 9/00
(Continued)

(56) References Cited

U.S. PATENT DOCUMENTS 3,801,779 A * 4/1974 Ver Sluis ................ G01W 1/14
250/222.1
4,064,648 A * 12/1977 Cary ...................... A01G 9/227
47/17
(Continued)

FOREIGN PATENT DOCUMENTS

CA    2530158 A1    12/2004
JP    5-123061 A    5/1993
(Continued)

*Primary Examiner* — Tien Q Dinh
*Assistant Examiner* — Brady W Frazier
(74) *Attorney, Agent, or Firm* — Norton Rose Fulbright Canada LLP

(57) ABSTRACT

A snow melting system for greenhouse comprises sensors for measuring an accumulation of snow on or at the greenhouse. A snow melting processor unit comprises an accumulation rate calculator for calculating an accumulation rate of the snow from the measured accumulation, and a heating prioritizer for actuating at least one of at least two different heating systems of the greenhouse as a function of at least the accumulation rate. A rooftop greenhouse system comprises a greenhouse adapted to be mounted to a rooftop surface. Two or more different heating systems mounted to the greenhouse to heat a roof of the greenhouse, and controlled by the snow melting system.

20 Claims, 2 Drawing Sheets

(51) Int. Cl.
   *E04D 13/10* (2006.01)
   *A01G 9/14* (2006.01)
   *A01G 9/20* (2006.01)

(52) U.S. Cl.
   CPC .............. *E04D 13/103* (2013.01); *F24H 9/20* (2013.01); *Y02A 40/25* (2018.01)

(58) Field of Classification Search
   USPC .............. 47/17, 23.3, 58.1 R; 52/1, 2; 135/1
   See application file for complete search history.

(56) References Cited

U.S. PATENT DOCUMENTS

| | | | | |
|---|---|---|---|---|
| 4,936,060 A * | 6/1990 | Gelinas | ................ | E04D 13/103 52/1 |
| 5,550,349 A * | 8/1996 | Bomba | ................ | E04B 7/163 219/213 |
| 5,890,322 A * | 4/1999 | Fears | ................ | E04D 13/0762 340/580 |
| 6,675,100 B1 * | 1/2004 | Hallett | ................ | G01W 1/14 356/336 |
| 7,071,446 B1 * | 7/2006 | Bench | ................ | E04D 13/103 219/211 |
| 8,621,779 B1 * | 1/2014 | Howard | ................ | A01G 9/245 47/17 |
| 8,689,500 B2 * | 4/2014 | Clifford | ................ | E04D 13/106 219/210 |
| 9,890,967 B2 * | 2/2018 | Buduri | ................ | G05B 15/02 |
| 2006/0289000 A1 * | 12/2006 | Naylor | ................ | E04D 13/103 126/96 |
| 2007/0205308 A1 * | 9/2007 | Nishida | ................ | B05B 1/20 239/547 |
| 2012/0266669 A1 * | 10/2012 | Sage | ................ | B64D 15/20 73/170.26 |

FOREIGN PATENT DOCUMENTS

| | | |
|---|---|---|
| JP | 3132598 U | 6/2007 |
| JP | 2002-213106 A | 4/2013 |
| KR | 10-2013-0032618 A | 4/2013 |

* cited by examiner

US 11,006,584 B2

SNOW MELTING SYSTEM AND METHOD FOR GREENHOUSE

CROSS-REFERENCE TO RELATED APPLICATION

The present application claims priority of U.S. Patent Application No. 61/928,495, filed on Jan. 17, 2014.

FIELD OF THE APPLICATION

The present application relates to greenhouses and more particularly to snow melting systems for greenhouses such as rooftop greenhouses.

BACKGROUND OF THE ART

Hydroponic cultivation and human-assisted growing methods have become more popular in highly populated cities where cultivable soils are non-existent. It is known that buying local food has many benefits. In fact, how the food is grown, stored, transported and processed has a large impact on climate change and environment. For example, the transport-related impacts on global warming and on pollutant emissions for the importation of fresh food are quite important. The large distance that imported food travels from where it is grown to where it is purchased or consumed, often known as food miles, results in important emissions of greenhouse gases such as carbon dioxide. Hence, increasing local production of fresh products by the use of greenhouses could have a significant positive effect on the environment.

Cultivable soils surrounding large cities are on their way to disappearing due to a phenomenon called urban sprawl. In fact, cities and their suburbs are spreading outwardly over rural lands, causing a decrease in cultivable soils, as well as a reduction in production of local products such as fresh vegetables and fruits. Such a decrease in agricultural lands is causing an increase in importation of fresh products from foreign regions or countries.

As a result, rooftop greenhouses have emerged as a viable solution to address such issues. In Northern climates, rooftop greenhouse engineering is not standard to the industry because the facilities must meet local building codes, which include more stringent requirements for snow load and other structural considerations than farm codes.

In the snow belt region (Northeastern quadrant of North America), a typical greenhouse facility at ground-level is built according to more lenient farm codes that require the structure to sustain for instance 15 lb per square foot of snow load, primarily because the structure is low-occupancy and at ground level. On the other hand, municipal building codes for rooftop greenhouses require may require for instance up to 45 lb per square foot of snow load support and thus much greater structural engineering requirements.

It would therefore be desirable to build facilities with lower snow load requirements that still meet the safety requirements of local building codes, in order to reduce the high engineering requirements for current construction of facilities and enable maximum light penetration into the greenhouse area (with less structural shading and greater post spans).

SUMMARY OF THE APPLICATION

In accordance with the present disclosure, there is provided a snow melting system for greenhouse comprising: sensors for measuring at least an accumulation of snow on or at the greenhouse; and a snow melting processor unit comprising: an accumulation rate calculator for calculating an accumulation rate of the snow from the measured accumulation, and a heating prioritizer for actuating at least one of at least two different heating systems of the greenhouse as a function of at least the accumulation rate.

Further in accordance with the present disclosure, the snow melting processor unit comprises a snow accumulation calculator calculating snow accumulation from the measured accumulation.

Still further in accordance with the present disclosure, the sensors include sensors measuring at least an accumulation in an environment adjacent to the greenhouse, and the accumulation rate calculator calculates an environmental accumulation rate.

Still further in accordance with the present disclosure, the sensors include pressure sensors measuring at least an accumulation on the greenhouse.

Still further in accordance with the present disclosure, the accumulation rate calculator calculates an accumulation rate on the greenhouse.

Still further in accordance with the present disclosure, the snow accumulation calculator calculates snow accumulation on the greenhouse.

Still further in accordance with the present disclosure, the snow melting processor unit comprises a priority profile database comprising priority profiles, the heating prioritizer determining one of the priority profiles based on at least one of the accumulation rate and the snow accumulation, the heating prioritizer controlling the actuation of the at least two different heating systems of the greenhouse as a function of the determined priority profile.

Still further in accordance with the present disclosure, the snow melting processor unit comprises a heating profile database comprising heating profiles, the heating prioritizer identifying one of the heating profiles based on the determined priority profiles, the heating profiles comprising operation data for directing the heating prioritizer on the actuation of the at least two different heating systems.

Still further in accordance with the present disclosure, the snow melting processor unit comprises a heating profile database comprising heating profiles, the heating prioritizer identifying one of the heating profiles based on at least one of the accumulation rate and the snow accumulation, the heating profiles comprising operation data for directing the heating prioritizer on the actuation of the at least two different heating systems.

Still further in accordance with the present disclosure, a first of the heating profiles comprises operation data to actuate a single one of the heating systems, and wherein a second of the heating profiles comprises operation data to actuate both of the heating systems.

Still further in accordance with the present disclosure, a third of the heating profiles comprises operation data to actuate the single one of the heating systems at a level different than for the first of the heating profiles.

Still further in accordance with the present disclosure, an alarm system alerts an operator of the system based on at least one of the accumulation rate and the snow accumulation.

Still further in accordance with the present disclosure, there is provided a rooftop greenhouse system comprising: a greenhouse adapted to be mounted to a rooftop surface; at least two different heating systems mounted to the greenhouse to heat a roof of the greenhouse; and a snow melting system as described above to selectively actuate the at least two different heating systems.

Still further in accordance with the present disclosure, the at least two different heating systems have different heat delivery means.

Still further in accordance with the present disclosure, the at least two different heating systems are powered with a different type of heat source.

Still further in accordance with the present disclosure, a first of the heating systems comprises a network of pipes in which circulates hot refrigerant.

Still further in accordance with the present disclosure, the network of pipes is conductively connected to the roof of the greenhouse.

Still further in accordance with the present disclosure, the network of pipes passes in valleys of the roof of the greenhouse.

Still further in accordance with the present disclosure, a second of the heating systems is a system of curtains separating the greenhouse in a crop zone and a roof zone, an opening of the system of curtains releasing heat accumulated in the crop zone.

Still further in accordance with the present disclosure, the second of the heating systems includes heat-producing lighting.

Still further in accordance with the present disclosure, the heat-producing lighting comprises HPS lighting.

DESCRIPTION OF THE PREFERRED EMBODIMENTS

Figure 1:
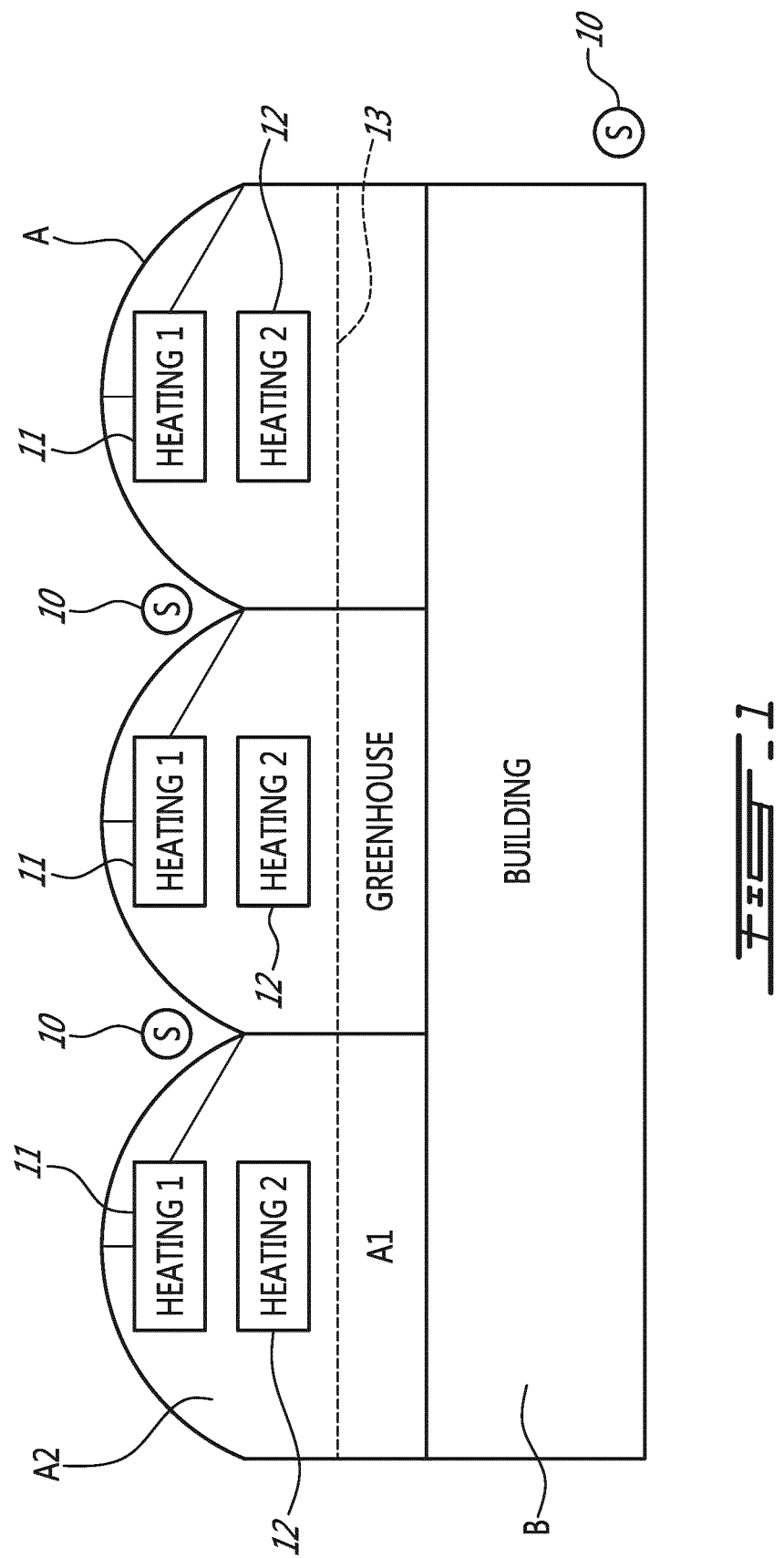
FIG. 1 is a schematic view of a rooftop greenhouse with a snow melting system for greenhouses in accordance with the present disclosure.

Referring to the drawings and more particularly to FIG. 1, there is illustrated a rooftop greenhouse A mounted to a rooftop of a building B. A snow melting system of the present disclosure is shown having various sensors 10 to measure snow accumulation. The sensors 10 may be positioned at any appropriate location, and are shown in valleys between roof sections. It is even considered to position sensors 10 on the ground, etc, so as to gather sufficient information to provide an accurate measure of snow accumulation and other conditions such as a temperature. The sensors 10 may hence be in multiple locations, for redundancy and accuracy. The sensors 10 may be independent of thawing and hence measure an absolute snow accumulation rate. On the other hand, other sensors 10 may calculate the real snow accumulation on the roof of the greenhouse A. For example, the sensors 10 measuring the real snow accumulation may be pressure sensors embedded in greenhouse columns, the measured pressure being proportional to the snow accumulation on the roof of the greenhouse A.

The snow melting system further comprises various types of heating, generically illustrated as heating 11 and heating 12. For instance, heating 11 is of the type in which a hot refrigerant circulates in pipes, as heated by any appropriate heat source (e.g., electric, gas, oil, etc). In the illustrated embodiment, heating 11 is connected to the drain system located in the valleys between roof sections inside or outside of the greenhouse A. The heating 12 may be of the convection type in which air is blown on radiators. The heating 12 may also be lighting that emits heat. For example, high-pressure sodium (HPS) lights or lamps generate heat that assist in heating up facilities. HPS lights are commonly used in greenhouses, as a supplemental source of light to complement sunlight. In such cases, the HPS lights may be broadly distributed to cover the whole greenhouse floor, and hence constitute a convenient heat source. Other types of lamps may also be used as heating 12.

It is considered to operate the various heating systems with three different and independent fuel sources, with two types of delivery mechanisms (e.g., 11, 12). This is to provide redundancy in heat generation and distribution systems. For example, the heating 11 and the heating 12 may have an electric coil and fluid pipe heated by a combustion heater. As another example, when the heating 11 is of the type in which a hot refrigerant circulates in pipes, a fossil fuel burner may be provided as main or auxiliary heat source of the refrigerant, along with a generator providing the necessary electricity to operate the heating 11 in case of power failure.

Still referring to FIG. 1, there is illustrated the curtain 13. The curtain 13 is of the type that is pulled across the top of the crop zone A1, e.g., above the plant heads, and along the walls of the greenhouse area. The curtain 13 thus creates an insulating barrier within the greenhouse area to trap heat in the crop zone A1 and reduce heat loss to the roof zone A2, above the curtain 13. The curtain 13 is typically used to reduce heating requirements at night and hence decrease energy consumption. It is known to automatically deploy the curtain 13 based on time of day (relative to dawn and dusk) to trap heat gained during the day and minimize heat loss from the greenhouse at night. In daylight-savings period in which HPS lights are used, the HPS lights may be positioned below the curtains 13 (i.e., in the crop zone A1) and operated to compensate for the reduce amount of sunlight, with the curtains 13 preserving some of the heat generated by the HPS lights in the crop zone A1. Moreover, the curtain 13 can also be used during the day in summer to shade the plants from excessive heat or light. Although reference is made above to the curtain 13 in singular, the use of curtain 13 is intended to cover systems of curtains 13. The opening of the curtain 13 may therefore be a source of heat for snow melting purposes. The basis of the use of the curtain 13 in snow accumulation avoidance is after the curtain 13 is closed for the night to reduce heat loss, the snow melting system may override this setting and open the curtain 13 to a given degree to allow heat to rise and warm the greenhouse roof for snow melting purposes. In such an occurrence, in the event that the HPS lights or equivalent are used as heating 12, it is contemplated to turn the lighting to activate this other heat source.

Figure 2:
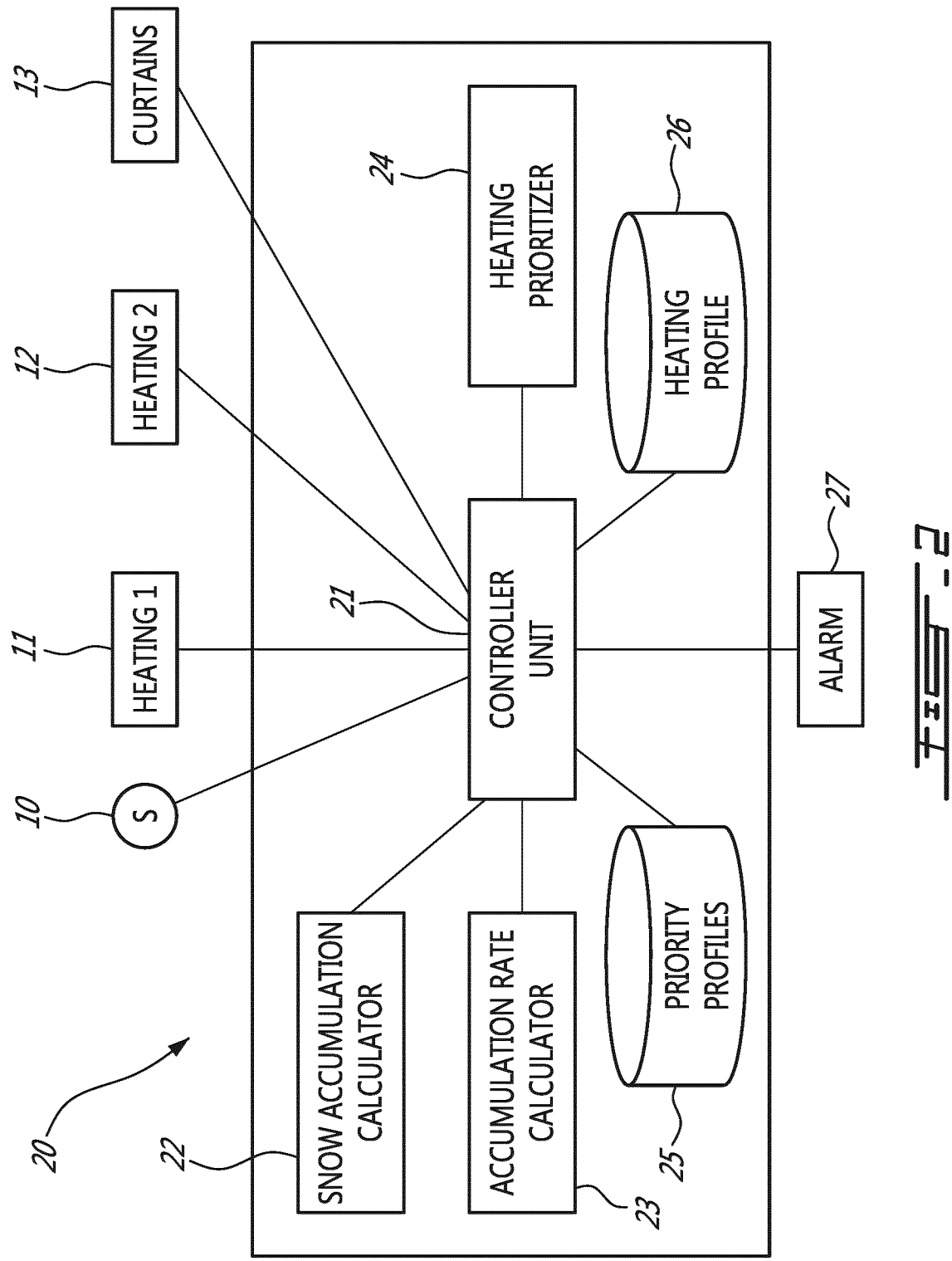
FIG. 2 is a block diagram of the snow melting system of FIG. 1.

Referring to FIG. 2, there is illustrated a snow melting system at 20 as used with the various components shown in FIG. 1. The snow melting system 20 is a comprehensive snow accumulation detection and prevention program, which is designed to enable the construction of greenhouses with lower snow loads and sufficient safety standards, to meet local building code.

The snow melting system 20 comprises a controller unit 21 that comprises a processor and any appropriate communication system to be operated remotely. In accordance with yet another embodiment, the controller unit 21 of the snow melting system 20 comprises its own battery unit to be operational despite a power outage. In accordance with the present disclosure, the battery unit of the snow melting system 20 may be recharged using available power sources (e.g., grid) or may be connected to a generator, among other ideas. The controller 21 is operationally connected—whether directly or indirectly through an additional operating system—to the sensors 10, heating 11, heating 12 and curtains 13, so as to have the capability to control their actuation and, if necessary and where applicable, override operating systems.

The snow melting system 20 comprises various modules that are operated by the controller unit 21. For instance, the snow melting system 20 is shown as featuring a snow accumulation calculator 22, an accumulation rate calculator 23, and a heating prioritizer 24. The snow mounting system 20 may also comprise various priority profiles 25 in a database, as well as data records 26. It is considered to provide the snow melting system 20 with an alarm 27. However, it is contemplated to use the communications system of the controller unit 21 to provide constant feedback to operators, via an operating system or portable devices such as cellular phones and tablets. Hence, the alarm 27 may be an audible snow accumulation alarm, with email and phone notification.

The snow accumulation calculator 22 receives the data from the sensors 10 to calculate the accumulation of snow on the greenhouse roof.

The accumulation rate calculator 23 monitors the progression of the snow accumulation provided by the snow accumulation calculator 22, to establish a rate of accumulation. The rate of accumulation may be an environmental or absolute rate of accumulation (i.e., excluding the thawing performed by the greenhouse) or an actual rate of accumulation on the roof of the greenhouse A, i.e., including the impact of the thawing on the snow accumulation.

The heating prioritizer 24 determines the heating requirements to prevent accumulation of snow beyond a given threshold. The heating prioritizer 24 therefore receives the snow accumulation data from the calculator 22, the rate of accumulation data from the calculator 23, in addition to other factors such as the temperature both inside and outside the greenhouse A. In order to select the appropriate heating profile, the heating prioritizer 24 may access the priority profiles of the database 25. Heating profiles 26 may be kept and consulted by the heating prioritizer 24 to select and implement the appropriate heating profile. Alternatively, the heating prioritizer 24 may actuate heating 11 and heating 12 based directly on the snow accumulation data from the calculator 22, and the rate of accumulation data from the calculator 23, without resorting to the use of databases 25 and/or 26.

The system 20 therefore operates an intelligent software program that measures snow accumulation totals, the rate and acceleration of accumulation, and historic data (equated from snow detection sensors and backend data), in order to prioritize and control the heat system of the greenhouse to eliminate high-risk snow accumulation. On the other hand, the system 20 aims at minimizing the amount of energy expended to eliminate high-risk snow accumulation, for cost efficiency purposes, and to avoid exposing the crops of the greenhouse to extreme temperatures. A backup power generator may be provided to ensure alarm and systems functionality.

Overall, the rooftop greenhouse facilities will be designed to a snow load requirement less than the local building codes and all above-mentioned technologies will be incorporated into systems design.

The priority profiles 25 may comprise different levels of priority, as a function of the factors measured by the snow melting system 20. For example:

Level 0: Snow detection and data logging, for historical data accumulation and tracking.

Level 1: Primary snow detection and program output, email alarm indication of initial snow accumulation detection and first-level prevention program activated (e.g., x number of sensors detecting y snow accumulation level, and/or z accumulation rate). In Level 1, heating system prioritization and heat distribution may be for accumulation prevention (e.g. snow melt enabled at higher minimum pipe temperature and lower heating requirement percentage)

Level 2: Secondary snow detection, or continued snow accumulation past Level 1 (e.g., z+1 accumulation rate detected, or accumulation remains or continues despite Level 1 preventative program) In Level 2, heating system prioritization at second stage may be for accumulation cancellation (e.g. snow melt enabled at second-level minimum pipe temperature and lower heating requirement percentage+top heat prioritized for snow accumulation prevention+curtain 13 opening override).

Level 3: Severe accumulation rate, or continued snow accumulation past Level 2 (e.g., z+2 accumulation rate detected, or accumulation remains or continues despite Level 2 preventative program). In Level 3, heating system re-prioritization at third stage may be for accumulation cancellation (e.g. snow melt enabled at third-level minimum pipe temperature and lower heating requirement percentage+heat distribution in other systems re-oriented+shade curtain 13 opening override).

Additional alarms levels may include:

Level 4: When some or all of the heating sources down, for instance due to power or system failure, any accumulation may be treated as Level 3 and the operators are alarmed of the critical situation.

Level 5: When accumulation prevention and control efforts are ineffective in offsetting the accumulation rate, the system 20 may trigger all snow accumulation control measures and alarm the operators in all possible ways.

The heating profiles 26 are associated with the various priority profiles 25, for a given heating profile to be implemented as a function of the priority profile determination by the heating prioritizer 24. Accordingly, the heating profile database 26 may include operational information on the various sources of heat/power, such as heating 11 and heating 12, including instructions on how to actuate the various heating systems to operate in the heating profile 26 of choice.

For example, the heating profile may include instructions on how the heating prioritizer 24 may activate the heating 11 to settings specific to the heating profile. If heating 11 is a radiator type system, whether it be electric coils or hot refrigerant, the heating profile 26 may require a desired power output by heating 11, while heating 12 is not turned on due to a lower priority. The desired power output may be based on refrigerant temperature in the case of hot refrigerant, or on operation current in the case of electric coils.

The heating profiles may also include the opening override of the curtains 13 in higher levels of priority. The opening of the curtains 13 may provide a substantial amount of heat calculated using the volume of the crop zone A1 and the ambient temperature in the crop zone A1 relative to the temperature of the ceiling walls of the greenhouse A. Likewise, the "heat" power output of the HPS lights may also be considered as being a heat surface that is part of the opening override of the curtains 13, to add a power component to the heat of the crop zone A1.

The creation of the heating profiles of the heating profile database 26 may be preprogrammed, considering that the power output and/or heating loads of the heating systems, including heating 11, heating 12, override of curtain 13, and/or operation of lighting, may be estimated beforehand. The calculation of the heating profiles takes into account the amount of heat required to maintain the snow accumulation within an acceptable level based on the level of priority, for the various priority profiles.

In operation, the controller unit 21 loops periodically to update the data provided by the snow accumulation calculator 22 and the accumulation rate calculator 23. In these loops, the controller unit 21 may obtain additional data, such as outdoor temperature (which may impact the accumulation rate), heating source availabilities, etc. By way of non-limitative example, it is considered to loop the controller unit 21 every 60 seconds. This periodic cycling may be performed only in accumulation periods (e.g. colder months of the year).

The heating prioritizer 24, based on the data obtained in the loop cycles, determines the applicable priority profile from the priority profile database 25. In order to avoid unstable operation, the heating prioritizer 24 may be programmed to re-assign a priority profile only after given consecutive priority-changing determinations have been made by the heating prioritizer 24. For example, if the heating prioritizer 24 identifies that the data received during the last 15 minutes (or more, or less delay) would prompt a priority profile change, the heating prioritizer 24 may implement the change of profile.

Once the heating prioritizer 24 determines that a change of priority is required, it will seek the heating profile associated with the priority profile, using the heating profile database 26. The heating profile consists of instructions to the heating prioritizer 24 on how to actuate or control the various heat sources of the system, namely heating 11, heating 12, override of curtains 13, lighting activation (if not part of heating 12).

The invention claimed is:

1. A snow melting system for a greenhouse comprising:
   sensors for measuring at least an accumulation of snow on or at the greenhouse; and
   a snow melting processor unit comprising:
      an accumulation rate calculator for calculating an accumulation rate of the snow from the measured accumulation, and
      a heating prioritizer for actuating at least one of at least two different heating systems of the greenhouse, the at least two different heating systems including at least a first heating system and a second heating system, the first heating system generating heat by a different type of heating than the second heating system, the at least two heating systems being operable as a function of at least the accumulation rate.

2. The snow melting system according to claim 1, wherein the snow melting processor unit comprises a snow accumulation calculator calculating snow accumulation from the measured accumulation.

3. The snow melting system according to claim 2, wherein the sensors include sensors measuring at least an accumulation of snow in an environment adjacent to the greenhouse, and the accumulation rate calculator calculates an environmental snow accumulation rate to determine the accumulation rate.

4. The snow melting system according to claim 2, wherein the sensors include pressure sensors measuring at least an accumulation of snow on the greenhouse.

5. The snow melting system according to claim 4, wherein the accumulation rate calculator calculates the accumulation rate on the greenhouse.

6. The snow melting system according to claim 2, wherein the snow melting processor unit comprises a priority profile database comprising priority profiles, the heating prioritizer determining one of the priority profiles based on at least one of the accumulation rate and the snow accumulation, the heating prioritizer controlling the actuation of the at least two different heating systems of the greenhouse as a function of the determined priority profile.

7. The snow melting system according to claim 6, wherein the snow melting processor unit comprises a heating profile database comprising heating profiles, the heating prioritizer identifying one of the heating profiles based on the determined priority profiles, the heating profiles comprising operation data for directing the heating prioritizer on the actuation of the at least two different heating systems.

8. The snow melting system according to claim 1, wherein the snow melting processor unit comprises a heating profile database comprising heating profiles, the heating prioritizer identifying one of the heating profiles based on at least one of the accumulation rate and the snow accumulation, the heating profiles comprising operation data for directing the heating prioritizer on the actuation of the at least two different heating systems.

9. The snow melting system according to claim 7, wherein a first of the heating profiles comprises operation data to actuate a single one of the heating systems, and wherein a second of the heating profiles comprises operation data to actuate both of the heating systems.

10. The snow melting system according to claim 9, wherein a third of the heating profiles comprises operation data to actuate the single one of the heating systems at a level different than for the first of the heating profiles.

11. The snow melting system according to claim 2, further comprising an alarm system for alerting an operator of the system based on at least one of the accumulation rate and the snow accumulation.

12. A rooftop greenhouse system comprising:
   a greenhouse adapted to be mounted to a rooftop surface;
   at least two different heating systems mounted to the greenhouse to heat a roof of the greenhouse;
   a snow melting system according to claim 1 to selectively actuate the at least two different heating systems.

13. The rooftop greenhouse system according to claim 12, wherein the at least two different heating systems have different heat delivery means.

14. The rooftop greenhouse system according to claim 12, wherein a first of the heating systems comprises a network of pipes in which circulates hot refrigerant.

15. The rooftop greenhouse system according to claim 14, wherein a second of the at least two different heating systems is a system of curtains disposed inside the greenhouse and separating a crop zone of the greenhouse roof zone of the greenhouse, the second of the heating systems being operable by opening of the system of curtains for releasing heat accumulated in the crop zone to the roof zone.

16. The rooftop greenhouse system according to claim 15, wherein the at least two different heating systems include heat-producing lighting.

17. The rooftop greenhouse system according to claim 16, wherein the heat-producing lighting comprises HPS lighting.

18. A snow melting system for a roof of a greenhouse comprising:

a first heating system operable to melt snow on the roof of the greenhouse;
a second heating system generating heat by a different type of heating than the first heating system, the second heating system being operable to melt snow on the roof of the greenhouse;
sensors configured for measuring a rate of accumulation of the snow on or at the greenhouse; and
at least one controller operatively connected to the sensors and the first and second heating systems, the at least one controller executing:
an accumulation rate calculator for calculating the rate of accumulation of the snow using the sensors, and
a heating prioritizer operatively connected to the first heating system and to the second heating system, the heating prioritizer
being configured to operate the at least one controller in any one of at least a first mode of operation, a second mode of operation, and a third mode of operation,
in the first mode the at least one controller operating the first heating system,
in the second mode the at least one controller operating the second heating system, and
in the third mode the at least one controller operating both the first heating system and the second heating system, and
being configured to operate the at least one controller in any one of the first mode, the second mode, and the third mode, based on the rate of accumulation of the snow.

19. The snow melting system according to claim 18, wherein the heating prioritizer is operatively connected to a priority profile database comprising priority profiles, the priority profiles including
an initial snow accumulation profile executable by the heating prioritizer in response to the accumulation rate calculator calculating the rate to be of at least a first magnitude,
the heating prioritizer when executing the initial snow accumulation profile operating the at least one controller in one of the first mode, the second mode, and the third mode to provide a first heat rate output by at least one of the first and second heating systems, and
a continued snow accumulation profile executable by the heating prioritizer in response to the accumulation rate calculator calculating the rate to be of at least a second magnitude,
the heating prioritizer when executing the continued snow accumulation profile operating the at least one controller in one of the first mode, the second mode, and the third mode to provide a second heat rate output by at least one of the first and second heating systems,
the second magnitude being larger than the first magnitude, the second heat rate output being greater than first heat rate output.

20. The snow melting system according to claim 18, wherein the first heating system and the second heating system are operable on different heat sources.

* * * * *